March 8, 1949.  L. H. HEUER  2,464,037
SPRING CUSHION ASSEMBLY
Filed Aug. 16, 1944
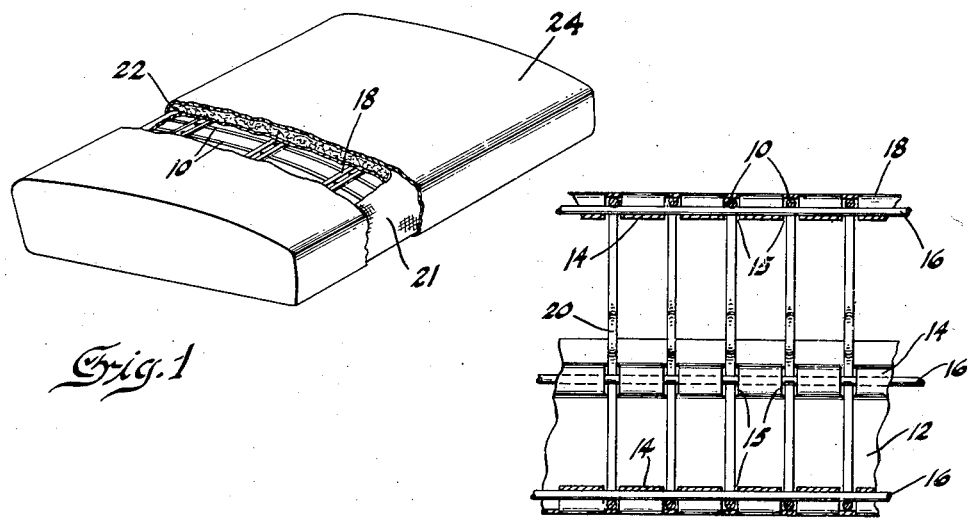
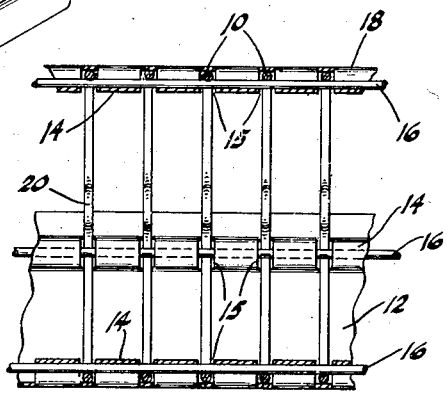
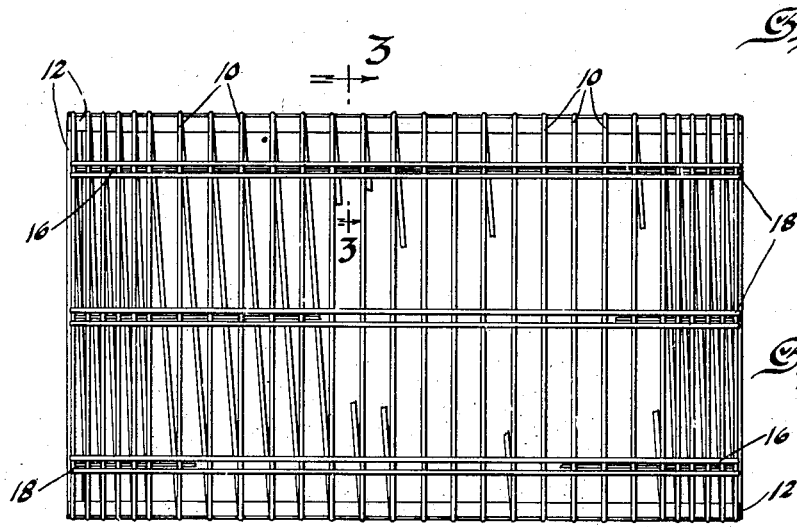
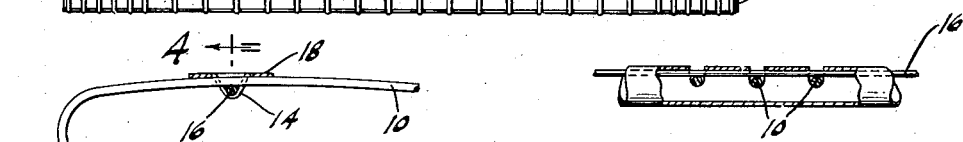
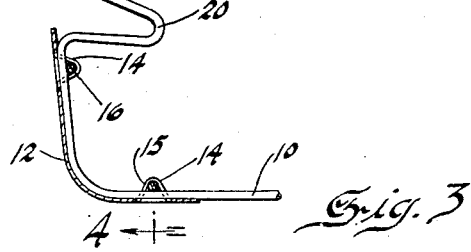
INVENTOR.
Lawrence H. Heuer
BY
Parker & Burton
attorneys Patented Mar. 8, 1949

2,464,037

UNITED STATES PATENT OFFICE 2,464,037

SPRING CUSHION ASSEMBLY

Lawrence H. Heuer, Detroit, Mich., assignor to Falls Spring & Wire Company, Chicago, Ill., a corporation of Michigan, and Great Lakes Spring Corporation, Chicago, Ill., a corporation of Illinois Application August 16, 1944, Serial No. 549,742

5 Claims. (Cl. 155—179)

1

This invention relates to an improved spring cushion assembly.

An object is to provide a spring cushion assembly which is light in weight, inexpensive as to cost, simple to manufacture and employs a minimum amount of spring material.

A spring cushion such as is illustrated is particularly intended for use in automobile seat or back cushions but the invention may be employed generally in spring cushions for upholstered furniture, beds and the like. One object of this invention is to provide a spring structure for use in a cushion assembly which spring structure may be formed as a continuous unit of indeterminate length and cut off in lengths as desired for use.

A further object is to provide a spring structure for use in a cushion assembly which spring structure is in the form of a continuous spiral succession of elongate spring coils extending transversely of the cushion and spaced apart linearly thereof. Such a succession of spiral coils is preferably characterized by having a group of coils adjacent to each end which are spaced more closely together than the intermediate coils between said two end groups.

Such a construction lends itself to simplicity of design and assembly and a meritorious feature resides in the provision of an improved spacer extending across successive springs and holding them in proper spaced apart relationship.

More particularly the spacer comprises a trough shaped element notched at intervals through the bottom of the trough to seat successive spring coils and having associated therewith a retaining strand extending along the bottom of the trough over the spring coils seated therein retaining said coils in place.

A portion or all of the supporting frame may be formed of metal and an advantageous feature resides in the provision of an angular frame element extending linearly along and embracing a bottom corner of the spring which frame element is provided with a linearly extending channel bent toward the spring and which channel is notched at intervals through its bottom to seat successive spring coils. The retaining strand extends along the bottom of the channel over the spring coils holding them in place.

Other objects, advantages and meritorious features will more fully appear from the following description, appended claims and accompanying drawing wherein:

Figure 1 is a perspective of an automobile seat cushion partially broken away embodying the invention.

2

Figure 2 is a plan of the spring assembly with the upholstery, padding and fabric removed.

Figure 3 is a cross-sectional view taken on the line 3—3 of Figure 2.

Figure 4 is a cross-sectional view taken on the line 4—4 of Figure 3.

Figure 5 is a fragmentary section of a modified form of spacer.

The spring structure which forms the foundation of the spring cushion assembly may be fabricated as a continuous spiral succession of elongate coils and cut off in lengths as desired for use. It may be fabricated from a single strand of material such as the spring wire shown in the drawings. In Figure 2 a spring structure fabricated in this manner is shown as cut off to the length required for a seat cushion. It will be noted that it consists of a spiral succession of elongate spring coils 10 which coils are flattened at the ends.

Each coil extends transversely of the cushion. The successive coils in the spiral are spaced apart linearly of the cushion as shown. It will be observed that a group of coils adjacent to each end have been compressed toward each other so that the spacing apart of the several coils in the group is substantially closer than the spacing of the intermediate coils between the two groups. This feature results in rigidifying the spring structure adjacent to each end thereover.

This spring structure is supported upon a suitable frame. This frame is a rigid rectangular frame and might be formed of wood to which the spring coils would be attached but as here shown is formed of metal and indicated as 12. The frame extends along the two side margins and the two end margins below the springs. In Figure 3, a frame element 12 is shown as of angular shape in cross-section to embrace the lower corner margin of the spring. Each angular portion of the frame element 12 is deformed to provide a channel or trough shaped extension 14 which is notched at intervals as at 15 throughout its length to seat one of the coils 10 as shown in Figure 3. These notches are of such a depth that the coils seat therein leaving a space for the insertion of a retaining strand or wire 16 to extend along the bottom of the trough 14 over the spring coils holding the same therein all as shown in Figures 3 and 4.

A plurality of spacer strips 18 are shown as extending across the top of the spring assembly. Each of these spacer elements is deformed providing a trough shaped or channel shaped part 14 which is also notched at 15 at intervals throughout its length to receive the spring coils.

These notches are of such a depth as to provide a space through which the retaining strand or wire 16 is passed as shown in Figures 3 and 4 seating in the bottom of the trough over the coils 10 holding said coils in place. In Figures 3 and 4 these trough shaped extensions are shown as bent out of a flat strip of metal but they might be formed of a tube as shown in Figure 5. The idea is to provide such a notched trough like structure, and the word trough is used as applied to a channel, tube or the like wherein the spring coils may be seated in successive notches and the retaining wire may be threaded through along the bottom of the trough over the spring coils.

In Figures 3 and 4 the spring coils are shown as bent providing a reentering angular portion 20 to increase the flexibility along this margin of the spring assembly.

The spring assembly is covered with suitable upholstery material as for example, a liner 21 in the form of burlap or the like. This liner is stretched over the spring coils. Over this liner is placed padding 22 and over the padding is stretched upholstery cloth 24. The upholstery cloth is pulled down and secured to the frame in any approved manner.

What I claim is:

1. In a spring cushion, a continuous spring element, wound to form a continuous spiral succession of elongate spring coils having elongated top portions and elongated bottom portions, a frame supporting said succession of coils, said coils extending transversely of the frame and spaced apart lengthwise thereof, said frame having a linearly extending channel formed therein projecting towards the spring, said channel being notched at linear intervals through its bottom to receive successive coils of the spring, successive coils of the spring seated within the notches of said channel and a retaining strand extending within and along the bottom of said notched channel holding the spring coils therein, a spacer comprising a channel extending longitudinally of the frame across successive coils of the spiral spring, said last mentioned channel being notched at linearly spaced apart intervals to receive successive coils of the spiral spring and a retaining strand extending linearly through the last mentioned channel over the coils seated therein to hold the successive coils of the spiral spring within the last mentioned channel.

2. In a spring cushion, a continuous spring element wound to form a continuous spiral succession of elongate spring coils having elongate top portions and elongate bottom portions, and flattened at the ends, an angular frame member extending linearly along and embracing a bottom end portion of said succession of spring coils, said coils extending transversely of the frame and spaced apart lengthwise thereof, each angular portion of the frame member provided with an inwardly projecting linearly extending channel notched at intervals through its bottom, successive coils of the spring seated within successive notches, and a retaining strand extending linearly through the channel and along the bottom holding successive spring coils therein.

3. In a spring cushion, a continuous spring element wound to form a continuous spiral succession of elongate spring coils having elongate top portions and elongate bottom portions, a frame element extending along a bottom end portion of said succession of spring coils, said coils extending transversely of the frame and spaced apart lengthwise thereof and said frame having a linearly extending channel formed therein projecting towards the spring, said channel being notched at linear intervals through its bottom to receive successive coils of the spring, successive coils of the spring seated within the notches of said channel and a retaining strand extending within and along the bottom of said notched channel holding the spring coils therein.

4. In a spring cushion, a continuous strip forming a succession of linearly spaced apart spring coils, a spacer comprising a channel extending transversely across said coils, said channel being notched at linearly spaced intervals to receive successive coils, the notches adjacent the ends of said channel being more closely spaced than the notches in the middle portion thereof, successive coils being seated within successive notches of the spacer, and a retaining strand extending linearly through the channel over the coils seated therein to hold successive coils in place therein.

5. In a spring cushion, a continuous strip forming a spaced linear succession of springs, having elongate straightened top portions, a spacer comprising a channel extending across said springs, said channel being notched at intervals to seat successive straight top portions of the springs, the notches adjacent the ends of said channel being more closely spaced than the notches in the middle portion thereof, and a retaining strand extending linearly through the channel over the springs seated therein to hold said springs within the channel.

LAWRENCE H. HEUER.

REFERENCES CITED

The following references are of record in the file of this patent:

UNITED STATES PATENTS

| Number | Name | Date |
|---|---|---|
| 19,451 | Semple | Feb. 23, 1858 |
| 121,990 | Chamberlain | Dec. 19, 1871 |
| 133,102 | Hollings | Nov. 19, 1872 |
| 182,797 | Branson et al. | Oct. 3, 1876 |
| 185,851 | Cobb | Jan. 2, 1877 |
| 244,835 | McLain | Feb. 24, 1880 |
| 771,191 | Venable | Sept. 27, 1904 |
| 788,825 | Gail | May 2, 1905 |
| 793,251 | Vallone | June 27, 1905 |
| 808,340 | Cardwell | Dec. 26, 1905 |
| 816,075 | Cook | Mar. 27, 1906 |
| 2,114,918 | Engstrom | Apr. 19, 1938 |
| 2,133,762 | Williams | Oct. 18, 1938 |

FOREIGN PATENTS

| Number | Country | Date |
|---|---|---|
| 5,026 | Australia | Sept. 27, 1927 |
| 447,222 | France | Aug. 14, 1912 |
| 569,346 | France | Jan. 6, 1924 |